ced by examiner

United States Patent
Bai et al.

(10) Patent No.: US 8,050,188 B2
(45) Date of Patent: Nov. 1, 2011

(54) REDUNDANT MESSAGE PACKET SUPPRESSION FOR IN-VEHICLE AD HOC NETWORK

(75) Inventors: Fan Bai, Troy, MI (US); Upali Priyantha Mudalige, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 796 days.

(21) Appl. No.: 12/147,547

(22) Filed: Jun. 27, 2008

(65) Prior Publication Data

US 2009/0323579 A1 Dec. 31, 2009

(51) Int. Cl.
*H04L 12/56* (2006.01)
*H04J 1/16* (2006.01)
(52) U.S. Cl. ......... 370/252; 370/329; 370/386; 370/412
(58) Field of Classification Search .................. 370/329, 370/252, 412, 386
See application file for complete search history.

(56) References Cited

U.S. PATENT DOCUMENTS

| 7,715,396 B2 * | 5/2010 | Castro et al. ................. 370/392 |
| 2005/0180399 A1 | 8/2005 | Park et al. |
| 2008/0085702 A1 | 4/2008 | Park et al. |

FOREIGN PATENT DOCUMENTS

WO WO2006016540 A1 2/2006

OTHER PUBLICATIONS

Ozan K. Tonguz, et al., On the Broadcast Storm problem in Ad hoc Wireless Networks, 2006.

* cited by examiner

*Primary Examiner* — John Pezzlo

(57) ABSTRACT

A method is provided for suppressing redundant packet message transmissions a multi-hop message delivery system. The vehicle receives message packets from any one of a plurality of vehicles within a broadcast range of the vehicle. The vehicle includes a buffer for holding the received message packets prior to re-broadcasting the message packets. A first estimation value is calculated as a function of a signal strength of the vehicle receiver for a respective received message packet. A second estimation value is calculated as a function of the buffer. A re-broadcast estimation threshold value is determined as a function of the first estimation value and the second estimation value. At least one triggering function is provided for generating an at least one triggering indicator. The respective message packet is re-broadcast in response to the re-broadcast estimation threshold value satisfying the at least one triggering indicator.

12 Claims, 4 Drawing Sheets

REDUNDANT MESSAGE PACKET SUPPRESSION FOR IN-VEHICLE AD HOC NETWORK

BACKGROUND OF INVENTION

The present invention relates generally to suppressing the re-broadcast of redundant messages in a vehicular ad hoc network.

Multi-hop geocast protocols provide for the periodic broadcasting of vehicle driving awareness conditions such as slow moving vehicles (SVA) and post crash notification (PCN). Vehicles disseminate messages conditions containing warning information to other vehicles within a broadcasting range for notification of the various driving conditions. The objective of message dissemination is to reduce accidents by forewarning vehicle drivers of such conditions. When a vehicle receives a notification message, the receiving vehicle attempts to re-broadcast the message to other vehicles within its broadcasting range for alerting other vehicles of the existing condition.

The drawback with the above described system is the flooding of messages (e.g., broadcast storm) within the network. When the majority of the vehicles within a broadcast range attempt to re-broadcast messages, the wireless channel becomes overloaded, resulting in packet collision. The result of such an overload is performance degradation with respect to communication reliability.

SUMMARY OF INVENTION

An advantage of an embodiment provides for a reliable and efficient distribution of messages within the message geocast protocol as a result of the suppression of duplicate message transmissions within the vehicular ad hoc network.

An embodiment contemplates a method for suppressing redundant packet message transmissions in a vehicle having a multi-hop message delivery system. The vehicle has a receiver for receiving message packets from any one of a plurality of vehicles within a broadcast range of the vehicle. A transmitter re-broadcasts the message packets to the plurality of nearby vehicles. The vehicle includes a buffer for holding the received message packets prior to re-broadcasting the message packets. A first estimation value is calculated as a function of a signal strength of the vehicle receiver for a respective received message packet. A second estimation value is calculated as a function of the buffer. A re-broadcast estimation threshold value is determined as a function of the first estimation value and the second estimation value. At least one triggering function is provided for generating an at least one triggering indicator. The respective message packet is re-broadcast in response to the re-broadcast estimation threshold value satisfying the at least one triggering indicator.

DETAILED DESCRIPTION

A multi-hop geocast protocol refers to a delivery of information to a group of destinations in wireless ad-hoc network. The dissemination of messages packets within a vehicular ad-hoc network has typically been dynamic since each node forwards the messages based strictly on network connectivity. The multi-hop message delivery system described herein provides for a tri-mode packet suppression scheme that adaptively prevents vehicles within the vehicular ad hoc network from conducting unnecessary message re-broadcast as opposed to forwarding a message to other vehicles based strictly on network connectivity.

Figure 1:
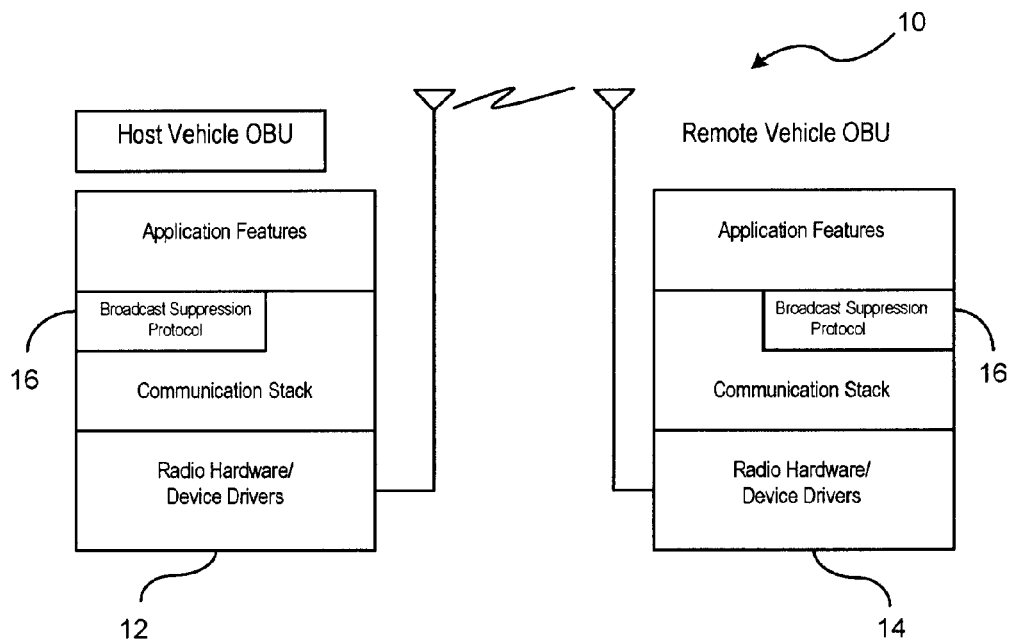
FIG. 1 is a block diagram of the vehicle communication system according to an embodiment of the invention.

FIG. 1 illustrates a block diagram of a vehicle communication system for receiving broadcast message packets, processing the message packets, and for re-broadcasting the message packets. A vehicle communication system 10 having communications devices such as an on-board unit (OBU), for broadcasting message packets between vehicles. A host vehicle OBU 12 is shown communicating with a remote vehicle OBU 14. Each respective OBU includes a broadcast suppression protocol 16 for suppressing redundant messages.

The message packets are broadcast between the host vehicle OBU 12 and the remote vehicle OBU 14 via their respective antennas. Message packets are received from any one of the plurality of remote vehicles within a broadcast range of the vehicle. The system uses a dedicated short range communication protocol (DSRC), or like system, as the communication protocol. The advantage of using the DRSC protocol is that given the received message packet may contain the exact location of the problem (e.g., accident), the DRSC provides a means for the vehicle receiving the message to know its own exact location and correlate this with the data of the message to determine if the problem is of a concern to the vehicle receiving the message so that a forewarning may be provided of the potential problem.

Figure 2:
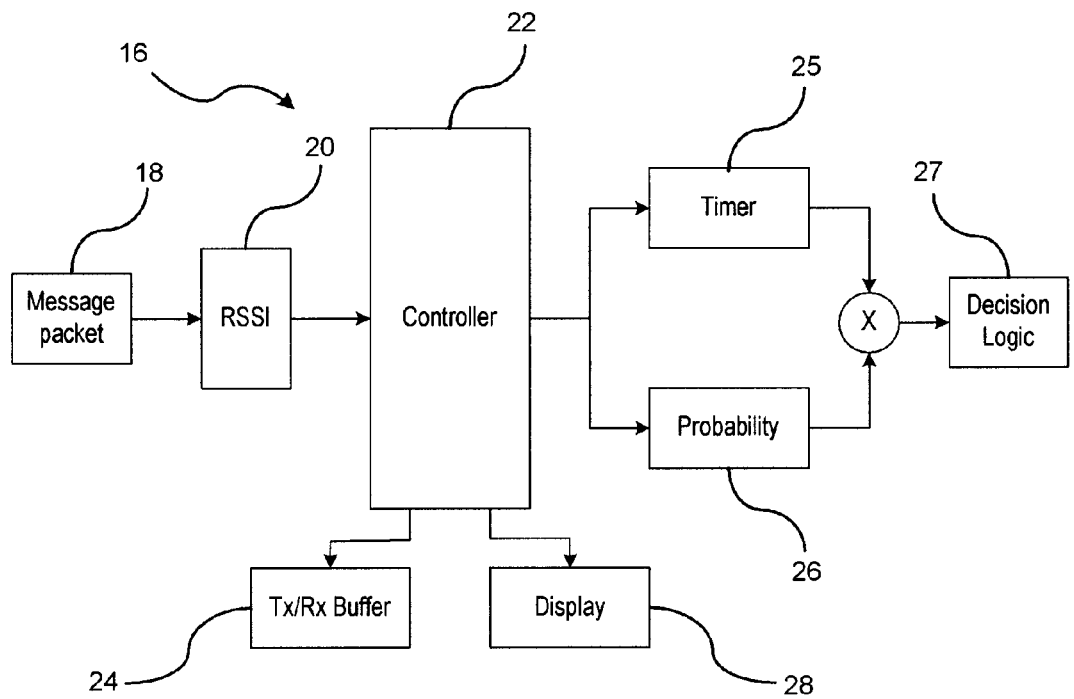
FIG. 2 is a block diagram of the vehicle broadcast suppression protocol according to an embodiment of the invention

A broadcast suppression protocol 16 is shown in greater detail in FIG. 2. Incoming data packets are received via a respective antenna and are processed by the respective hardware and driver devices of the radio receiver and communicated to the receiving stack where the incoming data packets are received at 18. A received signal strength indicator (RSSI) 20 is obtained by the receiving circuit for determining the signal strength of a respective received message.

The message data packet and the signal strength are provided to a controller 22. The controller 22 executes a broadcast suppression algorithm and determines whether to re-broadcast the message packet.

A receiving and transmitting buffer 24 is provided for storing incoming messages prior to re-broadcasting. The message packets stored in the buffer 24 are maintained in the buffer 24 until a respective message is either re-broadcast or canceled based on the controller 22 determining whether re-broadcasting a respective message is warranted. Re-broadcasting a respective message packet is based any combination of two related evaluations, specifically a timer based approach 25 or a probability based approach 26, each of which will be discussed in detail later.

A decision logic block 27 determines whether to re-broadcast the message packet based on the evaluations of the timer based approach 25 and/or the probability based approach 26.

The re-broadcasting of the message packets may be provided to any one of the plurality of vehicles within a broadcast range of the vehicle 10.

A display 28 may also be provided for alerting the driver to any potential problems based on the contents of the message packet received. The display may include a visual warning or audible warning.

The multi-hop message delivery system provides for a tri-mode packet suppression scheme, specifically, a timer-based approach, a probability-based approach, or a hybrid based approach.

In a first embodiment, a timer-based approach is provided for determining whether to suppress a re-broadcast message using the timer-based approach. When a respective vehicle receives a new message packet, the vehicle calculates a time-based value $T_i$. Time-based value $T_i$ represents a delay in re-broadcasting the message packet so that a determination may be made of whether a duplicate message has been received prior to the delay expiring.

The time-based value $T_i$ is determined as a function of a first estimation value and a second estimation value. The first estimation value is calculated as a function of the signal strength of the message packet as received by the vehicle receiver. That is, when the vehicle receiver receives the new message packet, a receiving circuit measures the signal strength of the received wireless message. The RSSI 20 is provided to the controller 22 for determining the signal strength of the received signal broadcasting the message packet. The RSSI 20 is an indication of the power of the received signal. The first estimation value is determined as a function of the signal strength and is represented by the formula:

$$\alpha_n \left(1 - \frac{|s_i - S_{opt}|}{S}\right) \quad \text{eq. (1)}$$

where $\alpha_n$ is a respective weighting factor, $s_i$ is a signal strength of the incoming packet, $S_{opt}$ is a desirable signal strength value, and S is a signal strength variation range.

The second estimation value for determining the time-based value $T_i$ is calculated using a current size of the buffer 24 and the maximum size of the buffer 24. The current size of the buffer 24 relates to the present capacity of the buffer 24 whereas the maximum buffer size relates maximum capacity of the buffer 24. The second estimation value as determined as a function of the buffer 24 is represented by the following formula:

$$\beta_n \left(1 - \frac{b_i}{B}\right) \quad \text{eq. (2)}$$

where $\beta_n$ is a weighting factor, $b_i$ is a buffer size of the vehicle, and B is a maximum buffer size.

The time-based value $T_i$ is determined as a function of the first estimation value and the second estimation value. The time-based value $T_i$ is represented by the following formula:

$$T_i = \frac{\tau}{\left[\alpha_1 \left(1 - \frac{s_i - S_{opt}}{S}\right) + \beta_1 \left(1 - \frac{b_i}{B}\right)\right]} \quad \text{eq. (3)}$$

where $\tau$ is a maximum per-hop latency, and $\alpha$ and $\beta$ are weighted factors.

The time-based value $T_i$ represents the delay in re-broadcasting the message packet. The delay is generated by a triggering function such as timer. A triggering indicator represents a respective count value that is equal to the time-based value $T_i$ which indicates the completion of delay. Upon timer counting to the respective count value, the message packet may then be re-broadcast. Prior to re-broadcasting, a determination is made whether a duplicate copy of the message packet has been received by the receiver, before the timer has reached the respective count value. If a message packet has been received prior to the timer reaching the respective count value, then the timer for re-broadcasting of the message packet is canceled. For example, the triggering function (i.e., timer) initiates a counter. When the counter equals the triggering indicator (i.e., respective count value), a determination is made whether a duplicate message packet has been received prior to the delay expiring. If a duplicate message packet is not received during the delay period, then the message packet is re-broadcast after the delay has expired. If a duplicate message packet is received prior to the delay expiring, then the message packet is not re-broadcast and is deleted from the buffer.

In a second embodiment, a probability-based approach is provided for determining whether to suppress a re-broadcast message packet. When a respective vehicle receives a new message packet, the vehicle calculates a probability-based value $P_i$. The probability-based value $P_i$ represents a probability value of a willingness to re-broadcast the newly received message packet.

The probability-based approach utilizes the first estimation value and the second estimation value as described above. The probability $P_i$ is determined based on the following formula:

$$P_i = \alpha_2 \left(1 - \left|\frac{s_i - S_{opt}}{S}\right|\right) + \beta_2 \left(1 - \frac{b_i}{B}\right) \quad \text{eq. (4)}$$

Suppression of the message is determined by comparing the probability-base variable $P_i$ to a respective triggering indicator. The triggering indicator is generated by a respective triggering function. In this embodiment, the respective triggering indicator is a randomly generated value $P_{rn}$ and the respective triggering function is a probability density function, preferably a uniform probability density function. The randomly generated value $P_{rn}$ has a randomly distributed range of [0,1]. For example, a randomly generated value $P_{rn}$ is calculated and is represented by a value between 0 and 1 (e.g., 0.7). Since the probability density function is uniformly distributed, and based on a value of 0.7, there would be a 70% chance that the random generator generates a number less than 0.7. In this embodiment, we compare the probability-based value $P_i$ to the randomly generated value $P_{rn}$. If $P_i > P_{rn}$, then a determination is made to re-broadcast the message packet. If $P_i < P_{rn}$, then a determination is made not to re-broadcast the message packet.

The third embodiment represents a hybrid-based approach. The hybrid approach includes the formulas shown in equations (3) and (4) for determining whether to re-broadcast the message packet. In the hybrid-based approach, when the vehicle receives a new message packet, the controller calculates the time-based value $T_i$ using formula shown in equation (3) and a probability-base variable $P_i$ using the formula shown in equation (4). The timer is initiated for delaying the re-broadcasting of the message packet. The calculated time-based value $T_i$ is decremented until the time expires. If a duplicate copy of the message packet is received before the delay expires, then the controller cancels the re-broadcasting of the respective message. If a duplicate copy of the message packet is not received before the delay expires, then a further determination is made whether to re-broadcast the message packet based on the probability-based value $P_i$. The probability-based value $P_i$ is compared to the randomly generated value $P_{rn}$. If the probability-based value $P_i$ is less than the randomly generated value $P_{rn}$, then the message packet is not re-broadcast. If the probability-based value $P_i$ is greater than the randomly generated value $P_{rn}$, then the message packet is re-broadcast.

Figure 3:
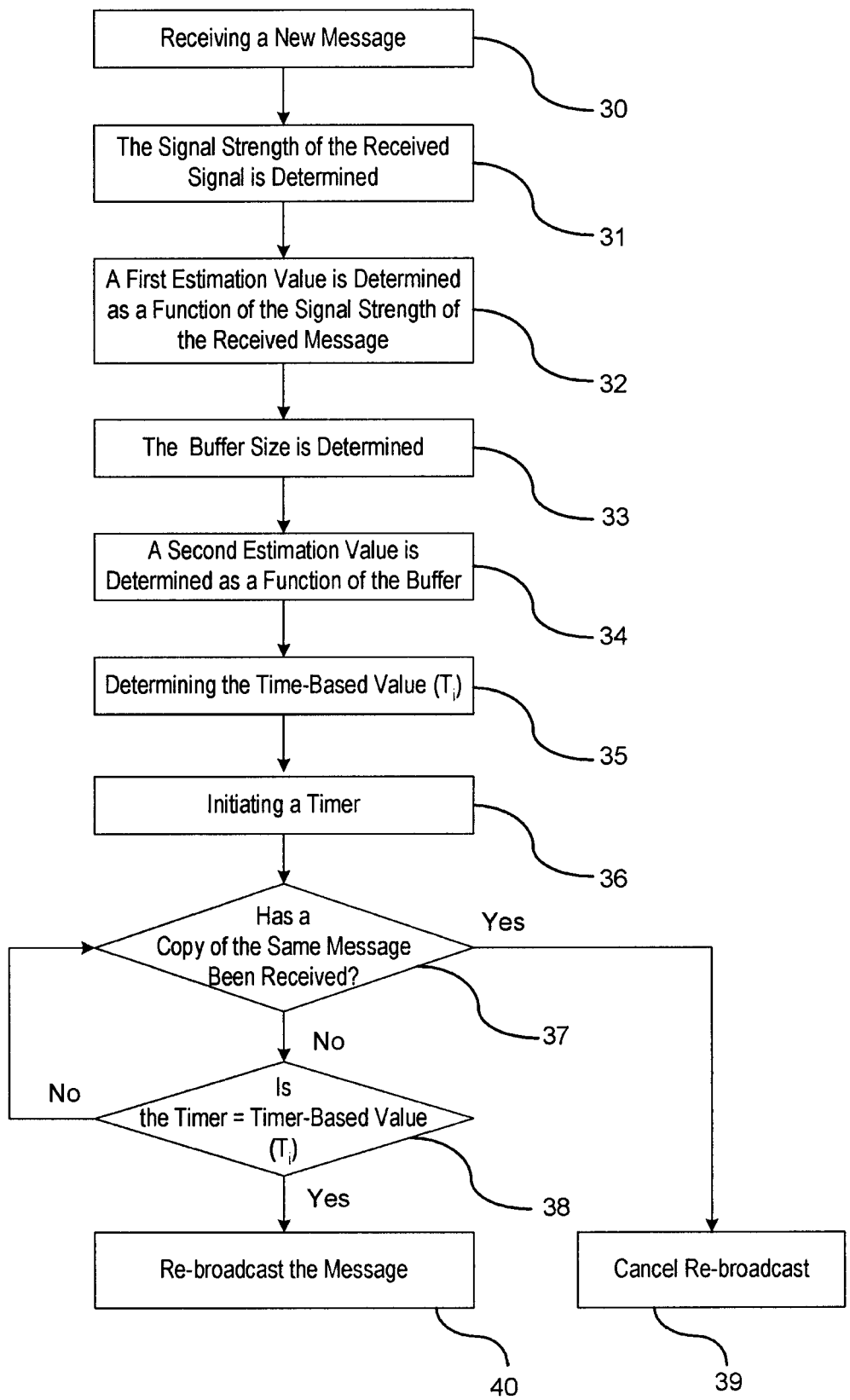
FIG. 3 is a flowchart of a method for a redundant pocket message suppression transmission using a timer-based approach according to an embodiment.

FIG. 3 illustrates a flowchart of a method for suppressing redundant message packet transmissions in a vehicle using a multi-hop message delivery system based on the timer-based approach. When a respective vehicle receives a new message packet, the vehicle calculates a time-based value $T_i$, which represents the delay in re-broadcasting the message packet. During this delay period, a determination is made whether a duplicate message packet is received for further determination of whether to re-broadcast the message packet.

In step 30, a new message packet is received by the receiver of the vehicle. Preferably, the message is broadcast using the DRSC protocol or similar protocol dedicated to a short range network communication system. In step 31, a signal strength of the received signal is determined. In step 32, a first estimation value is determined as a function of the signal strength of the received message packet. Other signal strength related characteristics such as the desirable signal strength and a variation range of the signal strength are used for determining the first estimation value. Weighting factors may also be used in determining the first estimation value.

In step 33, the current capacity of the buffer is determined. In step 34, a second estimation value is determined using the current capacity of the buffer. Other buffer related characteristics including the maximum capacity of the buffer are used to determine the second estimation value. Weighting factors may also be used in determining the second estimation value.

In step 35, the time-based value $T_i$ is determined using the formula shown in equation (3). In step 36, a timer is initiated until the time-based value $T_i$ is reached.

In step 37, a determination is made whether a duplicate copy of the same message packet has been received. If a copy of the same message packet has been received prior to the delay expiring (i.e., time-based value $T_i$ reached), then re-broadcasting the message packet is canceled in step 39. If the determination is made in step 37 that a duplication message packet has not been received, then the routine proceeds to step 38.

In step 38, a determination is made whether the time-based value $T_i$ has been reached indicating the delay has expired. If the determination is made that the time-based value $T_i$ has not been reached, then a return is made to step 37 to determine if whether a duplicate copy of the same message has been received. The routine will continuously loop between steps 37 and step 38 until a copy of the same message is received or the time-based value $T_i$ is reached. If the determination is made in step 38 that the time-based value $T_i$ is reached, then the message is re-broadcast in step 40.

Figure 4:
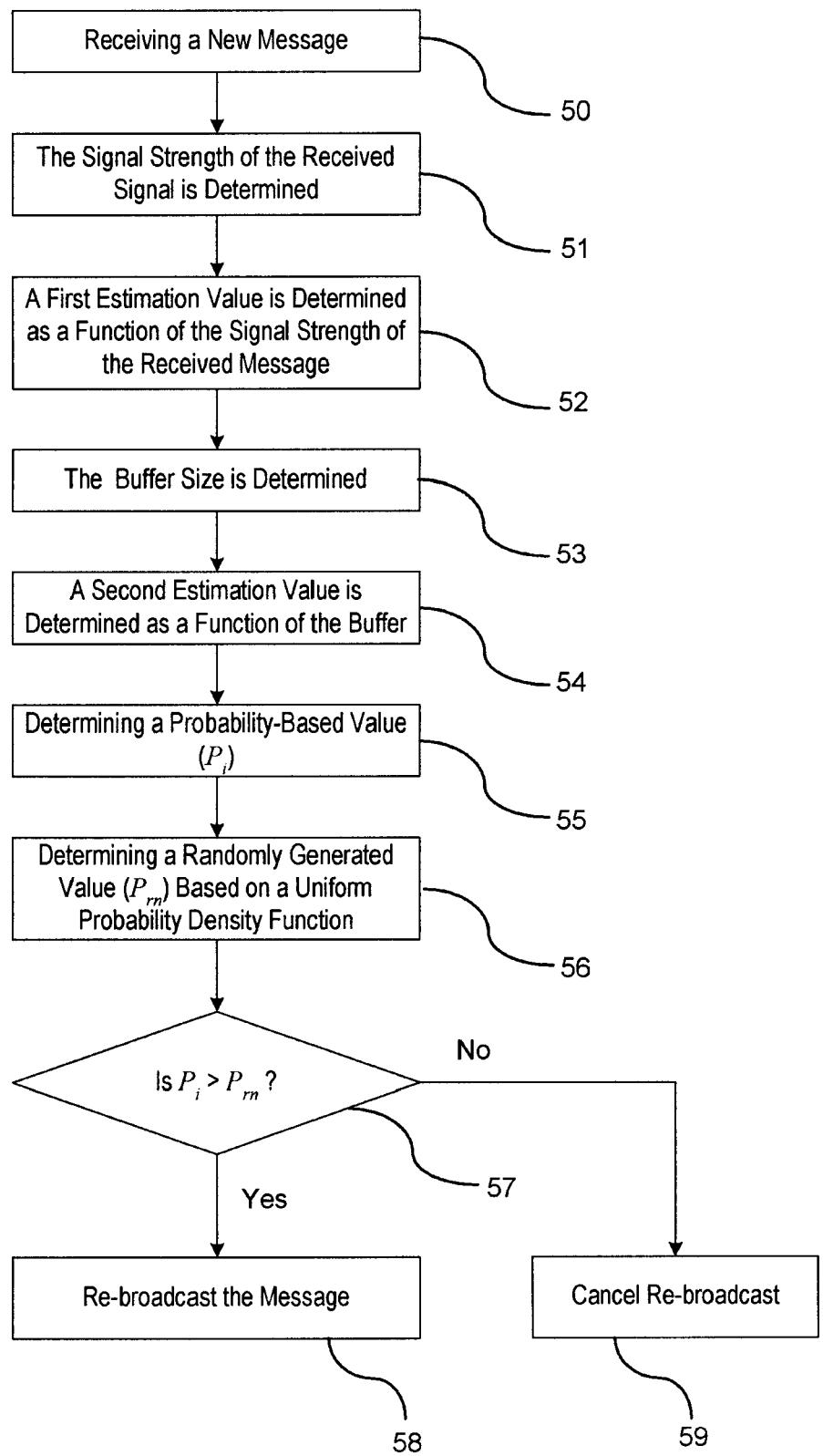
FIG. 4 is a flowchart of a method for a redundant pocket message suppression transmission using a probability-based approach according to an embodiment.

FIG. 4. illustrates an embodiment of a method for re-broadcasting a message packet based on the probability-based threshold approach. Steps 50-54 are essentially the same steps as steps 30-34 as shown in FIG. 3, and for redundancy purposes, these steps will not be discussed for this embodiment.

In step 55, the probability-based value $P_i$ is determined using the formula shown in equation (4). The probability-based value $P_i$ represents a willingness to re-broadcast the message packet. In step 56, a randomly generated value $P_{rn}$ is determined. The randomly generated value $P_{rn}$ is determined as a uniform probability density function which is a commonly used probability density function that applies to random variables.

In step 57, a determination is made whether the probability-based value $P_i$ is greater than the randomly generated value $P_{rn}$. If the probability-based value $P_i$ is greater than the randomly generated value $P_{rn}$, then the message is re-broadcast is step 58. If the probability-based value $P_i$ is less than the randomly generated value $P_{rn}$, then the re-broadcasting of the message is canceled in step 59.

Figure 5:
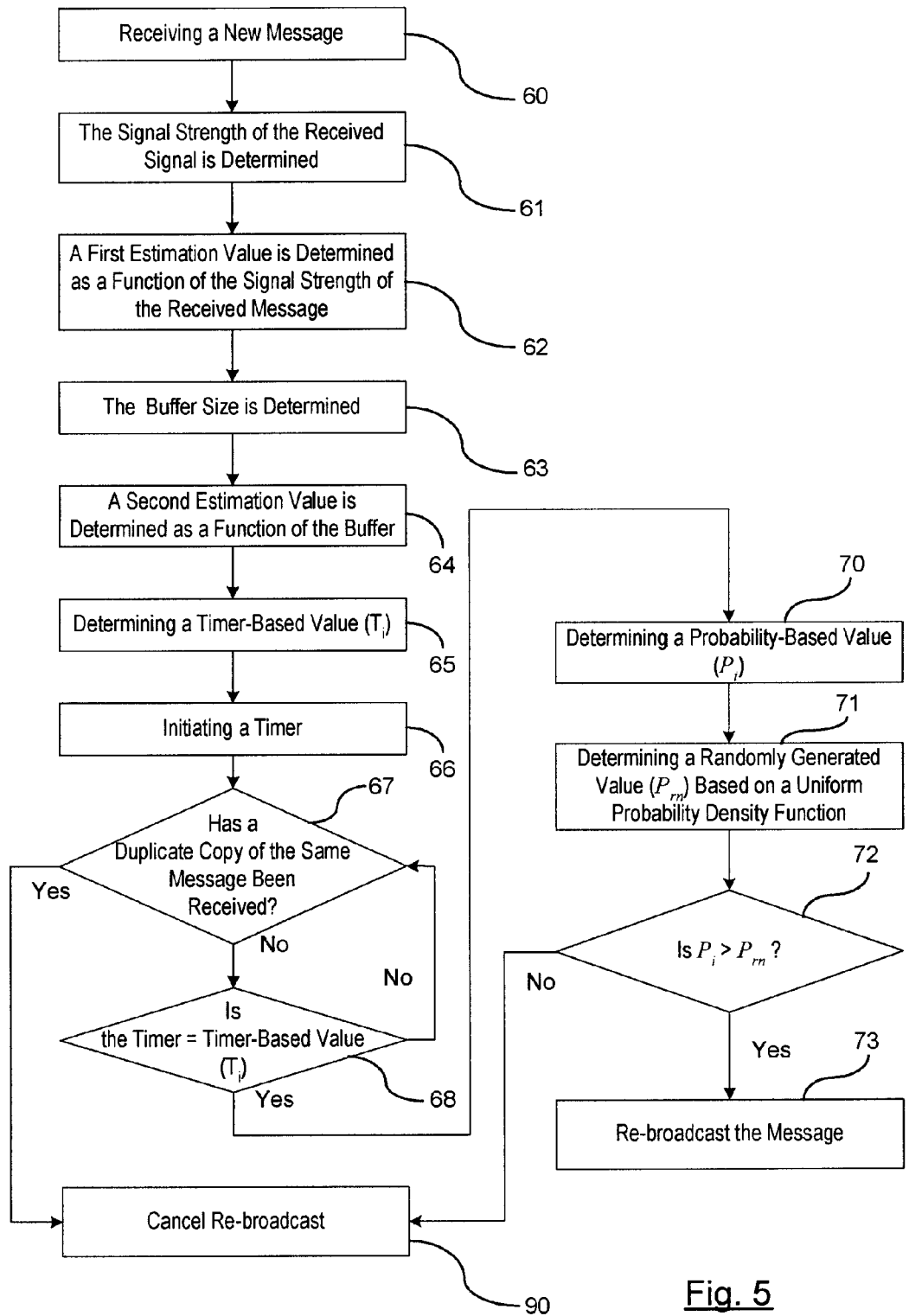
FIG. 5 is a flowchart of a method for a redundant pocket message suppression transmission using a hybrid approach according to an embodiment.

FIG. 5 illustrates an embodiment of a method for re-broadcasting a message based on a hybrid approach. The hybrid approach utilizes the time-based value $T_i$ and the probability-based value $P_i$ for determining whether to re-broadcast a message. Steps 60-69 are essentially the same steps as steps 30-39 as shown in FIG. 3, and for redundancy purposes, these steps will not be discussed for this embodiment.

In step 68, if the determination was made that the delay is expired and a duplicate copy of the message packet has not been received by the vehicle receiver, then in step 70, the probability-based value $P_i$ is determined using the formula shown in equation (4).

In step 71, a randomly generated value $P_{rn}$ is determined. In step 72, a determination is made whether the probability-based value $P_i$ is greater than the randomly generated value $P_{rn}$. If the probability-based value $P_i$ is greater than the randomly generated value $P_{rn}$, then the message is re-broadcast is step 73. If the probability-based value $P_i$ is less than the randomly generated value $P_{rn}$, then the re-broadcasting of the message is canceled in step 69.

While certain embodiments of the present invention have been described in detail, those familiar with the art to which this invention relates will recognize various alternative designs and embodiments for practicing the invention as defined by the following claims.

What is claimed is:

1. A method for suppressing redundant packet message transmissions in a vehicle having a multi-hop message delivery system, the vehicle having a receiver for receiving message packets from any one of a plurality of vehicles within a broadcast range of the vehicle, a transmitter for re-broadcasting the message packets to the plurality of nearby vehicles, the vehicle including a buffer for holding the received message packets prior to re-broadcasting the message packets, the method comprising the steps of:
    calculating a first estimation value as a function of a signal strength of the vehicle receiver for a respective received message packet;
    calculating a second estimation value as a function of the buffer;
    determining a re-broadcast estimation threshold value as a function of the first estimation value and the second estimation value;
    providing at least one triggering function for generating an at least one triggering indicator; and
    re-broadcasting the respective message packet in response to the re-broadcast estimation threshold value satisfying the at least one triggering indicator.

2. The method of claim 1 wherein the first estimation value is determined by the formula:

$$\alpha_n\left(1 - \frac{|s_i - S_{opt}|}{S}\right)$$

where $\alpha_n$ is a respective weighting factor, $s_i$ is a signal strength of the incoming packet, $S_{opt}$ is a desirable signal strength value, and S is a signal strength variation range.

3. The method of claim 2 wherein the second estimation value is determined by the formula:

$$\beta_n\left(1 - \frac{b_i}{B}\right)$$

where $\beta_n$ is a weighting factor, $b_i$ is a buffer size of the vehicle, and B is a maximum buffer size.

4. The method of claim 3 wherein the re-broadcast estimation threshold is a time-based value represented by the formula:

$$T_i = \frac{\tau}{\left[\alpha_1\left(1 - \frac{s_i - S_{opt}}{S}\right) + \beta_1\left(1 - \frac{b_i}{B}\right)\right]}$$

where $\tau$ is a maximum per-hop latency, and $\alpha$ and $\beta$ are weighted factors.

5. The method of claim 4 wherein the at least one triggering function includes a timer and the at least one triggering indicator includes a respective count value, and wherein the message is re-broadcast when the timer counts to a count value equaling the re-broadcast estimation value.

6. The method of claim 5 wherein re-broadcasting the message packet is canceled if a redundant message is received prior to the count value equaling the re-broadcast estimation value.

7. The method of claim 3 wherein the re-broadcast estimation threshold is a probability-based value represented by the formula:

$$P_i = \alpha_2\left(1 - \left|\frac{s_i - S_{opt}}{S}\right|\right) + \beta_2\left(1 - \frac{b_i}{B}\right).$$

8. The method of claim 7 wherein the at least one triggering function includes a probability density function and the at least one triggering indicator includes a randomly generated value generated by the probability density function, and wherein the message is re-broadcast if the former probability-based value is greater than the latter randomly generated value.

9. The method of claim 3 wherein the re-broadcast estimation threshold is a hybrid-based value represented by the following formulas:

$$T_i = \frac{\tau}{\left[\alpha_1\left(1 - \frac{s_i - S_{opt}}{S}\right) + \beta_1\left(1 - \frac{b_i}{B}\right)\right]},$$

and $$P_i = \alpha_2\left(1 - \left|\frac{s_i - S_{opt}}{S}\right|\right) + \beta_2\left(1 - \frac{b_i}{B}\right)$$

wherein the message packet signal is re-broadcast after the time-based value $T_i$ expires and the probability-based value $P_i$ exceeds the randomly generated value.

10. The method of claim 9 wherein re-broadcasting the message packet is canceled if a redundant message packet is received prior to the time-based value $T_i$ expiring.

11. The method of claim 9 wherein the at least one triggering function includes a timer function and the at least one triggering indicator includes a respective count value generated by the timer function, and wherein the at least one triggering function further includes a probability density function and the at least one triggering indicator further includes a randomly generated value generated by the probability density function, and wherein the re-broadcast estimation threshold value satisfies the at least one triggering function for re-broadcasting the message packet if the timer function counts to a count value equaling the time-based value prior to receiving a redundant message and if the probability-based value is greater than the randomly generated value.

12. The method of claim 1 wherein the first estimation value and the second estimation value are determined in real-time.

* * * * *